Patented Aug. 27, 1929.

1,725,795

UNITED STATES PATENT OFFICE.

MORTIMER T. HARVEY, OF NEW YORK, N. Y., ASSIGNOR TO THE HARVEL CORPORATION, OF NEWARK, NEW JERSEY, A CORPORATION OF NEW JERSEY.

PROCESS, STEPS, AND PRODUCT OF REACTION OF CASHEW-NUT-SHELL OIL.

No Drawing.    Application filed December 23, 1926. Serial No. 156,753.

The present invention relates to reaction products of cashew nut shell oil, to methods of making the reaction products, for getting them into solution, and for applying them. The invention further relates to a method for getting into solution a reaction product which is easily soluble and which is an intermediate stage to a reaction product which is hardly soluble or insoluble.

Various objects and advantages of the new and useful methods, processes, steps, and products and compositions of the invention will be apparent from the description thereof herein and from the claims which are part of this specification.

An example of a process and product of the invention follows. About 25 parts by volume of the oil or liquid from the shell of the cashew nut and about 10 parts of a 40% water solution of formaldehyde and about 5 parts of concentrated hydrochloric acid are mixed together in about 50 parts of gasoline or other suitable solvent and the mixture is let stand for about forty-eight hours at room temperature. During this time a reaction occurs which produces a small amount of water and a product soluble in the gasoline and two layers are formed, one a top gasoline layer which carries the dissolved reaction product and the other a water layer which carries unreacted acid and to the bottom of which settles reaction products which are not soluble in the gasoline. As the reaction continues the gasoline solution layer thickens in consistency until the reaction agents have substantially all reacted. The gasoline solution is then separated from the water and is preferably washed to remove traces of water and acid.

The solution of reaction product in gasoline made in this manner will dry in from three to five minutes at a temperature of about 104° C., that is the solvent will be driven off and the reaction product will be set into a condition in which it is insoluble in gasoline, benzene, benzol, naphtha, alcohol, and other similar solvents, and also insoluble in dilute or concentrated acids or alkalis, and in which it will be unaffected by boiling water.

In the reaction process other solvents than gasoline such as those cited in the above paragraph can be used for catching and dissolving the intermediate reaction product and for arresting the reaction so that a minimum or no amount of the insoluble product is formed. In the absence of the solvent the reaction, once it commences, goes so rapidly to completion that for many purposes it is impractical to secure a soluble product.

Aldehydes other than formaldehyde can be used in place thereof, and the reaction can be carried on without the addition of the hydrochloric acid or an equivalent. Also the proportions of ingredients and solvent are not the only practical ones, they can be varied to suit manufacturing, transportation and application condition without departing from the spirit of the invention.

The reaction product solution in any case can be applied to paper, cloth and other fabrics, wood, etc. and to metal surfaces for electrical insulating purposes, for water and moisture proofing, for finished, for coating the inner and other surfaces of containers and carriers particularly of acidic and basic materials, and for use in the arts generally.

Further, the reaction products of this invention in solution can be mixed with raw or cooked linseed oil, or China wood oil, tung oil or the like and applied and dried for any of the uses above noted or other suitable purposes. Also the solvent after the mixing can be driven off and other treatment of the mixture be done before use or application thereof. The resultant product will have the high dielectric strength, resistance to solvents, acids, alkalis and so on as well as any desirable characteristics of the linseed or other oil.

Subject matter disclosed in this application is claimed in my copending applications Ser. No. 285,787, filed June 15, 1928; and Ser. No. 341,271, filed February 19, 1929.

I claim:

1. The process which consists in bringing formaldehyde and cashew nut shell oil together in the presence of a solvent for the initial reaction product of these materials and under acid conditions to form a reaction product and to dissolve it in said solvent as it is formed.

2. The process which consists in bringing formaldehyde and cashew nut shell oil together in the presence of a solvent for the initial reaction product of these materials and under acid conditions to form a reaction product and to dissolve it as it is formed, and then separating therefrom any water, acid, or insoluble reaction product present.

3. The method of making and holding in condition for applying a product which consists in the process which comprises bringing together about 25 parts by volume of cashew nut shell oil, about 10 parts of a 40% water solution of formaldehyde, and about 5 parts of concentrated hydrochloric acid in a solvent for the initial reaction product of cashew nut shell oil and formaldehyde, and letting stand to effect a reaction product soluble in the solvent, and separating out any water, acid, or insoluble reaction product present.

4. The process which comprises bringing cashew nut shell liquid, formaldehyde and an acid catalyst together in the presence of a solvent for a reaction product thereof.

5. The method which comprises subjecting cashew nut shell liquid to the action of formaldehyde and an acid catalyst in a solvent for a reaction product of said materials.

6. The dissolved intermediate reaction product of cashew nut shell liquid, formaldehyde and an acid catalyst, which product is formed in solution in a solvent therefor.

7. The product dissolved in a solvent therefor, which is a reaction product between cashew nut shell liquid, formaldehyde and an acid catalyst when brought together in said solvent.

Signed at New York in the county of New York and State of New York this 22nd day of November A. D. 1926.

MORTIMER T. HARVEY.